UNITED STATES PATENT OFFICE.

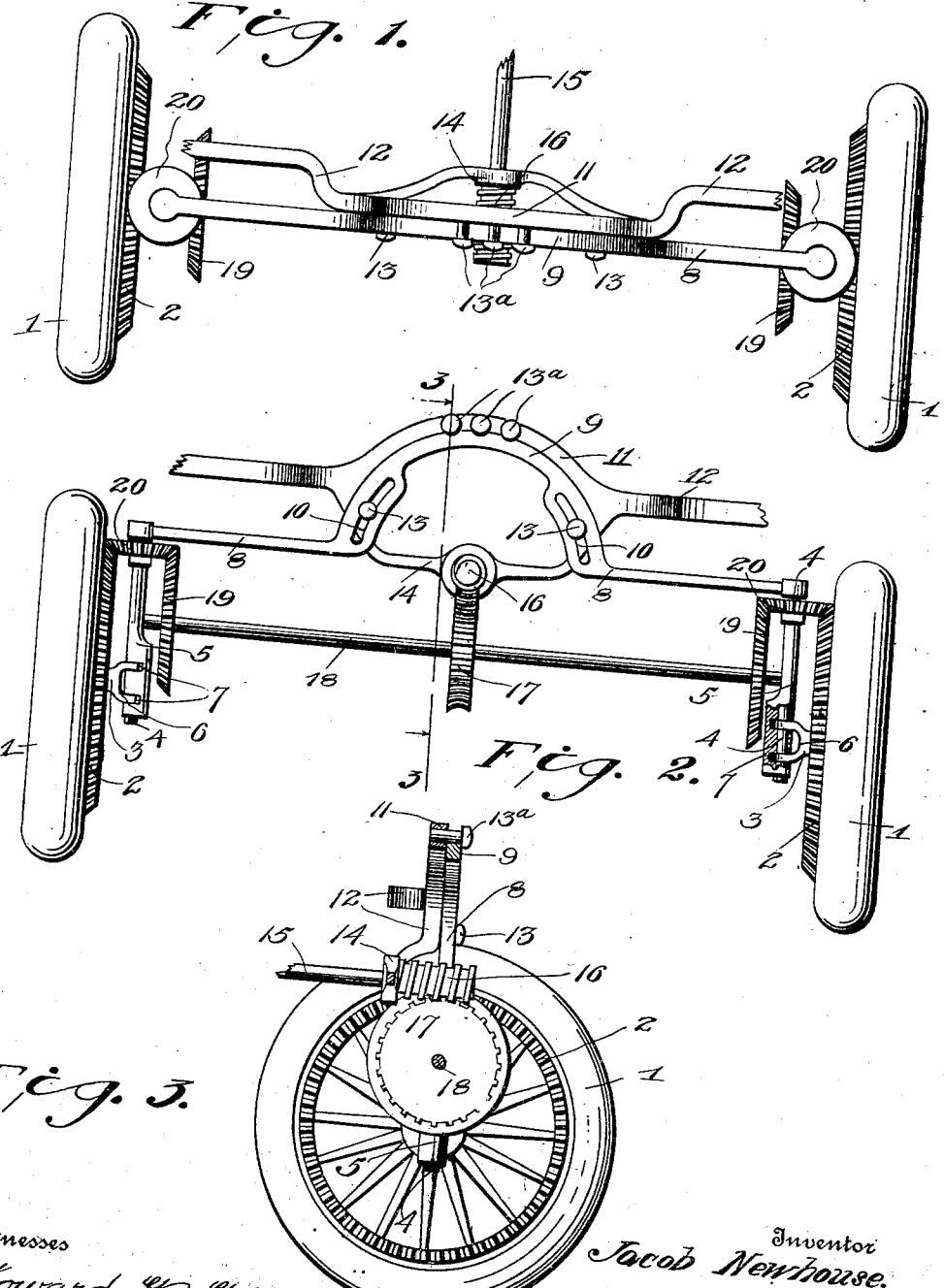

JACOB NEWHOUSE, OF BROWNVILLE, MINNESOTA.

WHEEL ATTACHMENT.

1,082,897.  Specification of Letters Patent.  Patented Dec. 30, 1913.

Application filed March 2, 1912. Serial No. 681,048.

*To all whom it may concern:*

Be it known that I, JACOB NEWHOUSE, a citizen of the United States, and a resident of Brownville, in the county of Houston and State of Minnesota, have invented certain new and useful Improvements in Wheel Attachments, of which the following is a specification, and in which like numerals of reference indicate similar parts in the several views.

This invention relates to improvements in front driving mechanism for motor vehicles.

One object of the invention is to provide an improved construction and arrangement of power transmitting and driving mechanism whereby the power of the motor is applied to the front wheels of the vehicle for operating the same.

Another object is to provide a front driving mechanism for motor vehicles which will be simple, strong and durable in construction, efficient in operation and which will not interfere with the turning of the front wheels for steering the machine.

With these and other objects in view, the invention consists of certain novel features of construction, combination and arrangement of parts as will be more fully described and claimed, it being further understood that changes in the specific structure shown and described may be made within the scope of the claim without departing from the spirit of the invention.

In the accompanying drawings forming a part of this specification and in which like numerals of reference indicate similar parts in the several views: Figure 1 is a top plan view of the front supporting and driving mechanism of a motor vehicle embodying my invention. Fig. 2, is a front view of the same. Fig. 3, is a vertical cross sectional view on the line 3, 3 of Fig. 2.

Referring more particularly to the drawings, 1 denotes the front wheels of a motor vehicle. To the rims or other suitable part of the wheels is secured a gear ring or annular series of beveled gear teeth 2. The wheels 1 are revolubly mounted on short stub axles 3, fixed to and projecting laterally at right angles from vertically disposed axle shafts 4, mounted to turn in bearing sleeves 5. The inner ends of the stub axles 3 are bifurcated or forked as at 6, said forked ends working through slots 7, in the sleeves 5 as shown.

The upper ends of the shafts 4 are mounted in and connected together by a cross bar or frame 8. The center of the frame 8 has formed therein a semi-circular arch 9, said arch having in its opposite sides segmental slots 10. The arched portion of the bar or frame 8 is pivotally attached to the arched central portion 11, of a body engaging bar or frame 12, to which is secured in any suitable manner, the body of the vehicle (not shown). The arch 9 is pivotally connected to the arch 11 of the frame 12 by headed studs 13, secured to the arch 11 and engaging the slots 10 in the arch 9 as shown. The arch 9 is also held in pivotal or rocking engagement with the arch 11 of the frame 12 by a series of headed studs 13ª, arranged in a curved line around the upper edge of the arch 9, the heads of said studs engaging or catching over the edge of the arch as shown.

On the bar or frame 12 below the arch 11 is arranged a centrally disposed bearing bracket 14, in which is revolubly mounted the forward end of the drive shaft 15, of the vehicle, said shaft having on its end a worm 16, which is operatively engaged with a worm gear 17, on a power transmitting driven shaft 18, arranged between and having its ends revolubly mounted in the bearing sleeves 5 of the axle shaft 4.

Fixedly mounted on the shaft 18 near its ends and adjacent to the sleeves 5 are bevel gears 19, which are engaged with idle bevel gear pinions 20, revolubly mounted on the upper ends of the shafts 4 between the upper ends of the sleeves 1 and the ends of the frame or cross bar 8. The pinions 20 are also in operative engagement with the bevel gears 2 on the wheels 1, whereby movement of the shaft 18 is transmitted to the wheels.

By connecting the drive shaft 15 with the gears 2 on the front wheels 1 as herein shown and described, it will be seen that said wheels are positively driven when turned in any direction, and without interfering with the operation of the steering mechanism (not shown), but which may be engaged with the stub axles 3 of the wheels in any suitable manner for turning the wheels in the desired direction.

By pivotally engaging or connecting the frame or cross bar 8 of the wheels 1 with the body supporting bar or frame 12, it will be seen that either of the wheels may pass over the obstructions or through ruts or depressions without further interfering with the driving or power transmitting mechanism. The advantages of driving both front and rear wheels of a motor vehicle are well known and need not be stated. The present invention has, however, more advantages than the ordinary front and rear wheel drive, owing to the peculiar construction and arrangement of the parts as herein described, and among which is the pivotal connection between the front running gear and driving mechanism and the front body supporting mechanism whereby the front wheels are continuously driven while passing over uneven ground or obstructions and through ruts, and when turned at various angles in steering the machine. This arrangement of gearing and driving mechanism also permits very short turns to be made by the vehicle, the driven front wheels pulling the front end of the vehicle around quickly in the desired direction.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my said invention, what I claim as new and desire to secure by United States Letters Patent is:

In combination, a frame having a central arch, studs secured to said arch, a crossbar having a semicircular arch for coaction with said first mentioned arch with slots engaged by said studs, a bearing sleeve secured to each end of said cross bar, a driven shaft having its ends working within bearings of said sleeves, a vertical pinion shaft revolubly held within each sleeve, a stub axle extending from each pinion shaft, a wheel upon each stub axle, a gear ring secured to each wheel, a pinion upon each pinion shaft in mesh with a gear ring, and gears upon said driven shafts in mesh with said pinions.

In testimony whereof I affix my signature, in presence of two witnesses.

JACOB NEWHOUSE.

Witnesses:
 JOHN W. POWERS,
 ARTHUR HACKETT.